Figure 1:
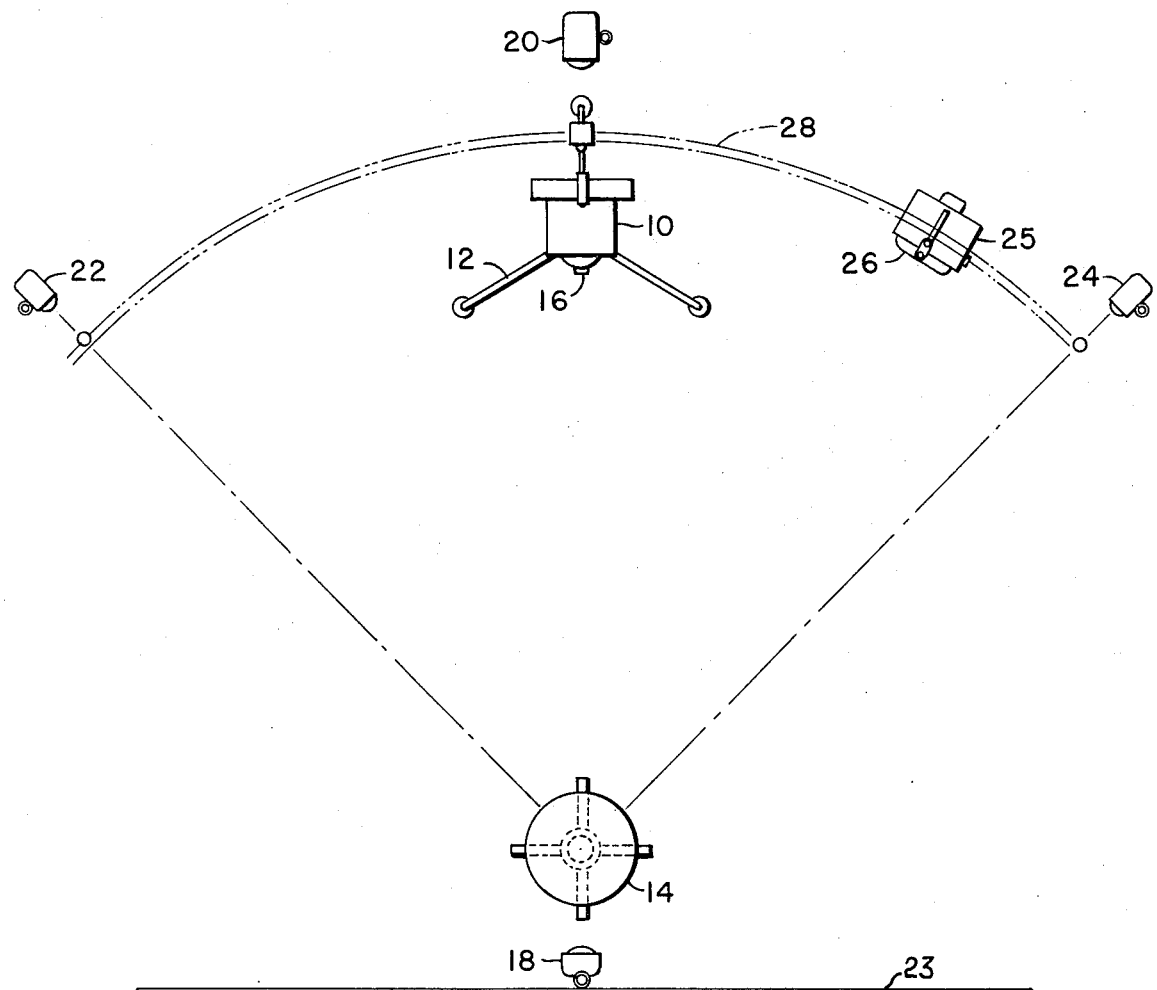

United States Patent [19]
Klebanow

[11] 3,812,506
[45] May 21, 1974

[54] SYSTEM FOR CHILD PHOTOGRAPHY
[76] Inventor: Ivan J. Klebanow, 330 Hill Top Ln., Cincinnati, Ohio 45215
[22] Filed: Mar. 16, 1973
[21] Appl. No.: 342,070

[52] U.S. Cl. ................................................. 354/80
[51] Int. Cl. ........................................ G03b 15/06
[58] Field of Search ............... 95/1, 12, 82; 353/74

[56] References Cited
UNITED STATES PATENTS
2,314,642  3/1943  Worcester .............................. 95/82
266,035  10/1882  Higgins .................................... 95/12
3,561,861  2/1971  Mayer ................................... 353/074
2,140,602  12/1938  Simjian ................................... 95/82

Primary Examiner—John M. Horan
Attorney, Agent, or Firm—Irwin P. Garfinkle

[57] ABSTRACT

A system for photographing children utilizes a rear screen projector for attracting the attention of the child and evoking various facial expressions. The locations of the camera, the child and the lights are each at a fixed station so that the system may effectively be used by semi-skilled operators.

8 Claims, 2 Drawing Figures

SYSTEM FOR CHILD PHOTOGRAPHY

BACKGROUND

This invention relates to a system of photography, and is particularly useful in photographing children.

The portrait photography of young children generally requires skilled professional photographers capable not only of arranging appropriate lighting and camera position, but also in evoking from the children various interesting attitudes and facial expressions. The child photographer must, therefore, not only be skilled in the art of photography, but must also be capable of handling a child.

The prior art photographer has used many devices to help him in obtaining appropriate expressions, the most famous being the "birdie." Quite frequently, the professional photographer uses an assistant to obtain the desired results.

In accordance with this invention, I provide a photographic system which can be operated by an unskilled, or at most a semi-skilled operator, and yet obtain the results normally expected of only the most competent professionals.

SUMMARY

In summary, in accordance with this invention, I provide a photographic system utilizing a camera mounted at a first fixed station and an elevatable platform for seating a photographic subject positioned at a second fixed station spaced from the first. Four strobe lights aimed at the subject station are mounted at fixed locations; a back hair light in line with the camera sight; a front light behind the camera; and selectively operable left and right main lights, each directed toward the subject at approximately a 45° angle with the camera sight. In addition, I mount a movable rear screen projector on a rail behind the camera, and in accordance with a main feature of the invention I exhibit various attention-attracting motion pictures and still pictures, each designed to evoke an expected response; e.g., surprise, laughter, joy, curiosity, thoughtfulness, etc. In addition, the projector is movable along the rail to each of several viewing stations causing the subject's head and eyes to follow. The position of the projector at various stations automatically selects the appropriate main light for operation.

THE DRAWINGS

Figure 2:
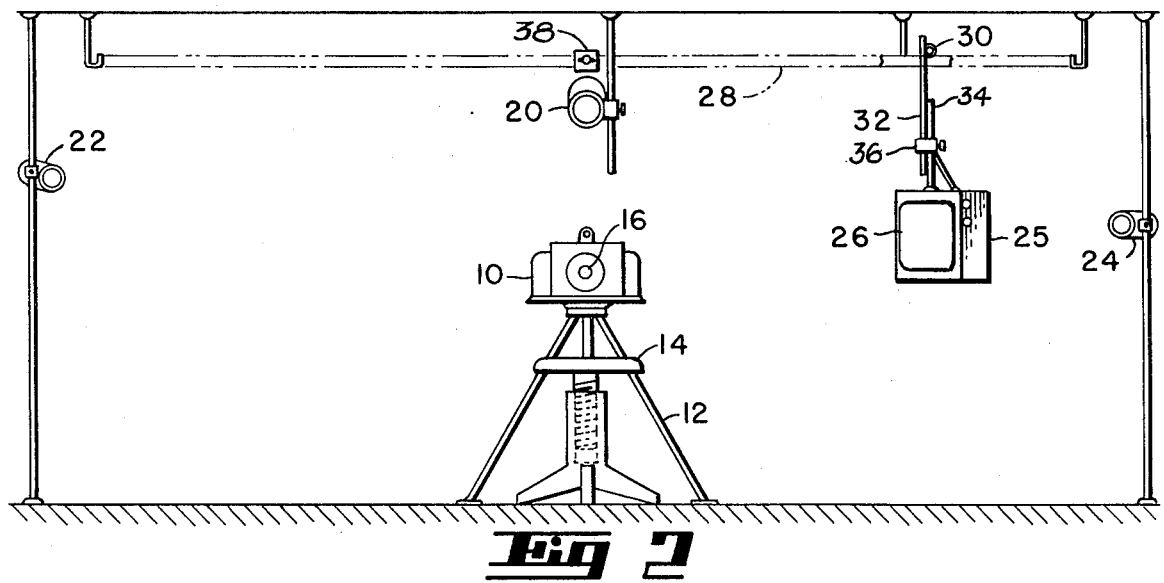

FIG. 1 is a schematic plan view of an illustrative embodiment of this invention; and FIG. 2 is an elevation of FIG. 1.

THE ILLUSTRATED EMBODIMENT

Referring now to the drawings, I show a photographic system intended for installation in a small studio which need only be large enough to accommodate the subject, its parent if the subject is very young, and the photographer. The system 1s intended primarily for the photographing of young children but may be useful for subjects of any age.

The equipment required in accordance with this invention includes a camera 10 mounted on a tripod or other stand 12 positioned at a first station. In addition, I locate a subject platform 14, herein illustrated as an elevatable stool, at a second station at which the camera lens 16 is focused. Preferably, the camera lens is a zoom type lens which can be adjusted to accommodate for portraits of several subjects. The photographic subject (not shown) is seated on the platform. Preferably, the first and second stations are fixedly located.

As seen in FIG. 2, the platform 14 is shown as a piano stool having a threaded shaft so that it is vertically adjustable in height and the subject's head can be elevated to a given position in space irrespective of the child's size. A stool or platform of other configurations, permitting the posing of more than one subject at a time, is also contemplated. This arrangement permits the location of the camera at a fixed height, and also permits the use of a fixed focus for the zoom lens 16.

In accordance with normal good portrait photographic practice, I use three strobe lights for illuminating the subject during the photographing procedure. I use a back hair light 18, located behind the subject for back illumination. I use a front light 20 located behind the camera 10 for providing front illumination. In addition I provide two main lights, left main light 22 and right main light 24. Both main lights are positioned at fixed points forming an angle approximately 45° between the stool 14 and the camera 10. Only one of the main lights 22 and 24 is used for any one photograph, depending on the direction the subject is looking. A panel 23 or other room divider provides an appropriate background.

To attract the child's attention and to evoke various facial expressions, I provide a projector 25, having a display 26. The projector 25 is mounted on a uni-rail 28 by means of a wheel 30 journaled on support rods 32 and 34 interconnected by a clamp 36 which permits the adjustment of the height of the screen. Preferably the projector 25 is a conventional rear screen projector suitable for showing films wound in conventional cassettes. An alternative projector may be of the type which accommodates an endless film on tape, or the projector may be a video cassette type. In any case, I display a wide variety of attention-getting, emotion-evoking motion or still pictures on the screen 26. I move the projector along the rail from side to side, the object being to cause the child's head and eyes to follow the displayed pictures so that it can be photographed in various head positions and with a number of interesting facial expressions. I use As noted previously, only one of the side lights 22 and 24 is used at any one time. To switch on one main light and switch off the other, Iuse a conventional position sensitive switch 38 mounted on the rail 28 at about its center. As the wheel 30 passes over the switch from right to left, the lamp 22 is switched on and the lamp 24 is switched off. As the wheel 30 passes in the opposite direction, the state of the lamps is reversed. In this way, if the child's eyes have followed the projector screen, the lights are always properly set.

While an electrical light circuit is not shown, it will be understood that a conventional power circuit will be required for operation of the lamps.

It is apparent that many variations and adaptations will be available to persons skilled in the art without departing from the spirit or scope of this invention. For example, while I have shown a piano type stool in which the seat is elevatable by means of a threaded post, the stool may also be hydraulically operated. Moreover, while I would prefer that the camera lens be of the fixed-focus zoom type, and that the lights be of a constant intensity and be fixedly positioned so that the operator need only operate the camera when he has obtained a suitable expression on the face of the subject, the system will be functional when certain of the elements require adjustments. In addition it may also be advantageous if the rear screen projector is made movable by means of a power device such as an electric motor, and while I have shown the rail 28 on which the projector 25 if supported as a curved rail, it is apparent that a straight rail may also be used and in some circumstances may be advantageous. Moreover, the invention also contemplates the use of more than one projector, each being located at a fixed station, but being selectively operable. The invention also contemplates the use of sound in conjunction with the displayed images.

While I have illustrated the invention using a camera positioned at a fixed height in combination with an elevatable stool, it is entirely within the scope of this invention to use a stool or other platform having a fixed height and making the height of the camera adjustable. Under these circumstances it may be advantageous also to adjust the height of the projector 24. The only essential feature is that the camera and subject heights be relatively adjustable.

I claim:

1. A photographic system for photographing a human subject, the combination comprising:

a platform positioned at a first station for supporting a subject;

a camera positioned at a second station and having a lens focused on a subject on said platform;

a projection screen positioned behind said second station in the view of said subject, interest-stimulating formations being displayed on said screen for evoking a variety of facial expressions from said subject; and means for moving said screen from side to side for causing the eyes and head of the subject to follow.

2. The invention as defined in claim 1 wherein said platform and said camera are relatively vertically adjustable.

3. The invention as defined in claim 2 wherein said first and second stations are fixed, and wherein the angular portions of the focus of said lens is fixed.

4. The invention as defined in claim 3 wherein said screen is the screen of a rear screen projector.

5. The invention as defined in claim 4, and a fixedly mounted elevated rail, said projector being supported on said rail.

6. The invention as defined in claim 5, and a plurality of lights for illuminating said subject, said lights including a light for front lighting, a light for rear lighting, and right and left selectively operable main lights for side lighting said subject.

7. The invention as defined in claim 6 wherein said right and left side lights are selectively operated automatically in response to the position of said rear screen projector.

8. The invention as defined in claim 5 wherein the position of said lights is fixed.

* * * * *

PO-1050
(5/69)

UNITED STATES PATENT OFFICE
CERTIFICATE OF CORRECTION

Patent No. 3,812,506          Dated  May 21, 1974

Inventor(s)    Ivan J. Klebanow

It is certified that error appears in the above-identified patent and that said Letters Patent are hereby corrected as shown below:

Column 1, line 59, "ls" should read --- is ---.

Column 2, line 46, delete "I use".

Column 2, line 49, "Iuse" should read --- I use ---.

Column 4, line 12, Claim 3 should read --- The invention as defined in Claim 2 wherein the angular positions of said first and second stations are fixed, and wherein the focus of said lens is fixed. ---.

Signed and sealed this 19th day of November 1974.

(SEAL)
Attest:

McCOY M. GIBSON JR.
Attesting Officer

C. MARSHALL DANN
Commissioner of Patents